US006938375B2

(12) United States Patent
Duncan et al.

(10) Patent No.: US 6,938,375 B2
(45) Date of Patent: Sep. 6, 2005

(54) POCKET DOOR ASSEMBLY

(75) Inventors: Lance W. Duncan, Lubbock, TX (US); James R. Underwood, Lubbock, TX (US); Dempsey A. Biles, Lubbock, TX (US)

(73) Assignee: Notch Corporation, Lubbock, TX (US)

( * ) Notice: Subject to any disclaimer, the term of this patent is extended or adjusted under 35 U.S.C. 154(b) by 184 days.

(21) Appl. No.: 10/356,877

(22) Filed: Feb. 3, 2003

(65) Prior Publication Data

US 2004/0148865 A1 Aug. 5, 2004

(51) Int. Cl.[7] .................................................. B60J 1/16
(52) U.S. Cl. ......................................................... 49/372
(58) Field of Search .......................... 49/372, 504, 374, 49/378, 323; 52/64, 207; 70/99

(56) References Cited

U.S. PATENT DOCUMENTS

| | | | | | |
|---|---|---|---|---|---|
| 1,421,331 | A | * | 6/1922 | West | 312/249.2 |
| 2,275,089 | A | * | 3/1942 | Pirtz | 70/99 |
| 3,214,948 | A | * | 11/1965 | Modrey | 70/99 |
| 4,742,645 | A | | 5/1988 | Johnston | |
| 5,125,202 | A | * | 6/1992 | Kissinger | 52/239 |
| 5,540,066 | A | * | 7/1996 | Takimoto | 70/99 |
| 5,575,321 | A | * | 11/1996 | Currier | 160/90 |

* cited by examiner

*Primary Examiner*—Jerry Redman
(74) *Attorney, Agent, or Firm*—Conley Rose PC; Mark E. Scott

(57) ABSTRACT

The specification discloses a pocket door assembly having a notch or recess in a pocket portion of the frame that allows for use of a protruding handle, such as a doorknob, to be used on a door portion of the assembly. In a second aspect, the specification discloses a latch mechanism for use with pocket doors that may utilize rotary handles, such as standard doorknobs.

3 Claims, 4 Drawing Sheets

FIG 9
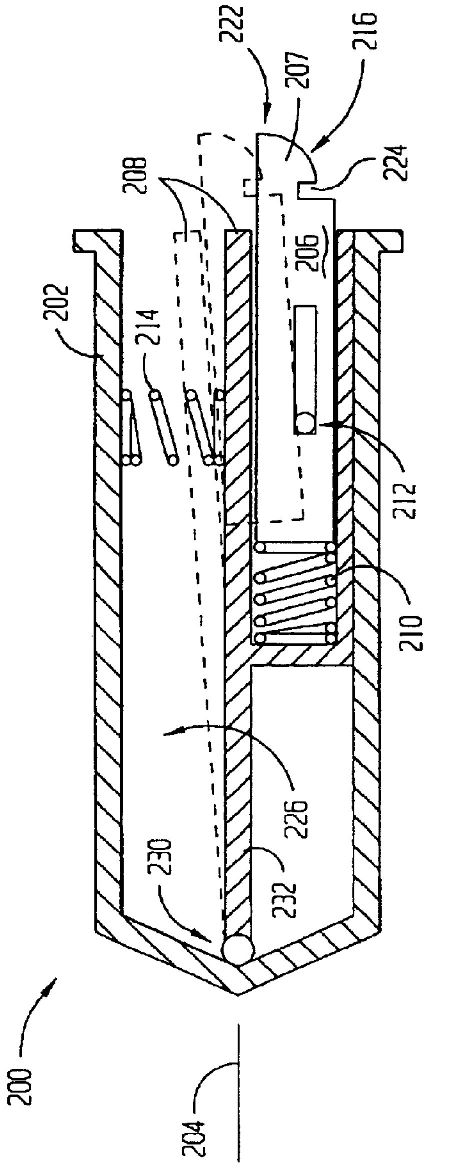
FIG 11
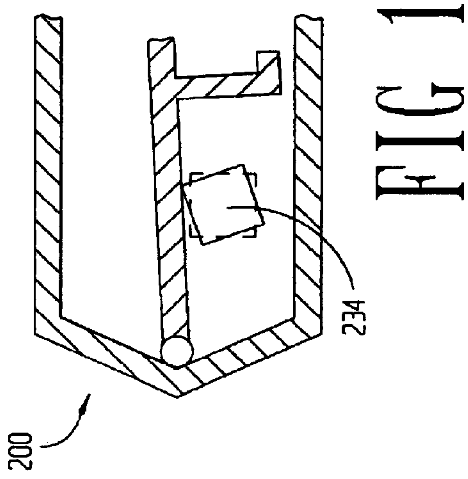
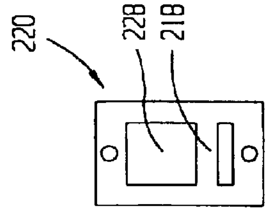
FIG 10

POCKET DOOR ASSEMBLY

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

Embodiments of the invention are directed to an improved pocket door assembly. More particular, the embodiments of the invention are directed to a pocket door assembly that may use a standard doorknob to facilitate opening and closing of the door.

2. Background of the Invention

A "pocket door" is a door that may be used within homes and offices that, rather than swinging on a hinge, slides or translates along an upper rail. In a closed position, a pocket door obstructs a doorway. In order to open a pocket door, the door itself slides into a "pocket" within walls immediately adjacent to the doorway. Pocket doors may be used in locations where it is disadvantageous for the door to swing.

FIG. 1 shows a related art pocket door assembly as it may be received from a manufacturer, with the door 40 in its fully open or retracted position. To close the related art door, the door 40 may be pushed into the pocket, where a spring biases the door out such that the door itself may be grabbed and pulled toward a closed position. Alternatively in the related art, a latch mechanism 42 may be used, at least initially, to pull the door from the retracted position.

FIG. 2, taken substantially along line 2—2 of FIG. 1, illustrates one possible construction of a frame of a related art pocket door assembly. In particular, this portion of the frame may comprise vertical lumber members 44 and 46, which may span the entire height of the frame assembly. Steel channels 48, 50 may be attached to the vertical lumber members 44 and 46 respectively, and it is within these channels 48, 50 that horizontal lumber cross members 52, 54, 56 and 58 (see FIG. 1) may attach. After installation of the pocket door assembly, sheet rock may be placed on top of the horizontal members 52, 54, 56 and 58, and pressed into the shoulder area 60. Thereafter, decorative trim may be attached to the vertical members 44 and 46, such as by the use of finishing nails. U.S. Pat. No. 4,742,645 to Johnston describes another possible construction of the frame portion of the pocket door assembly that may comprise use of metal channels within which pieces of lumber may be inserted.

Regardless of the particular construction of the frame, the door 40 in each of these related art devices is designed and constructed to slide fully within the pocket created by the frame. Because of this construction, it is not possible to have a doorknob or handle mechanism extending in a direction perpendicular to a plane defined by the door, as may be used on doors that rotate about a hinge assembly. Some pocket doors may attempt to implement door locks, but the lock mechanisms, because of the limited space between the door and the vertical members, are difficult to operate, at best.

Thus, what is needed in the art is a pocket door assembly design that overcomes these and other problems.

BRIEF SUMMARY OF SOME OF THE PREFERRED EMBODIMENTS

The problems noted above are solved in large part by a pocket door assembly that provides an indention or notch in the vertical members of the frame. The door of the pocket door assembly may comprise a handle that protrudes outwardly from a plane defined by the door by an amount greater than a clearance between the door and the vertical frame members. When the door is opened, the handle translates at least partially into a region or area defined by the notch. Opening and closing the door may thus be accomplished by applying force to the handle, and thereby sliding the door open or closed.

A second aspect of the preferred embodiments may be a locking mechanism for use with a pocket door that may be actuated using an off-the-shelf rotary-type doorknob as a handle. The latching mechanism may latch the door of the pocket door assembly in a closed position, and the latch may be released by rotating the doorknob to release the latch.

The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which:

FIG. 9 illustrates a cross-sectional view of a latch assembly in accordance with embodiments of the invention;

FIG. 10 illustrates a striker plate in accordance with embodiments of the invention; and FIG. 11 illustrates an exemplary contact of a handle connection member with bolt arm.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 1:
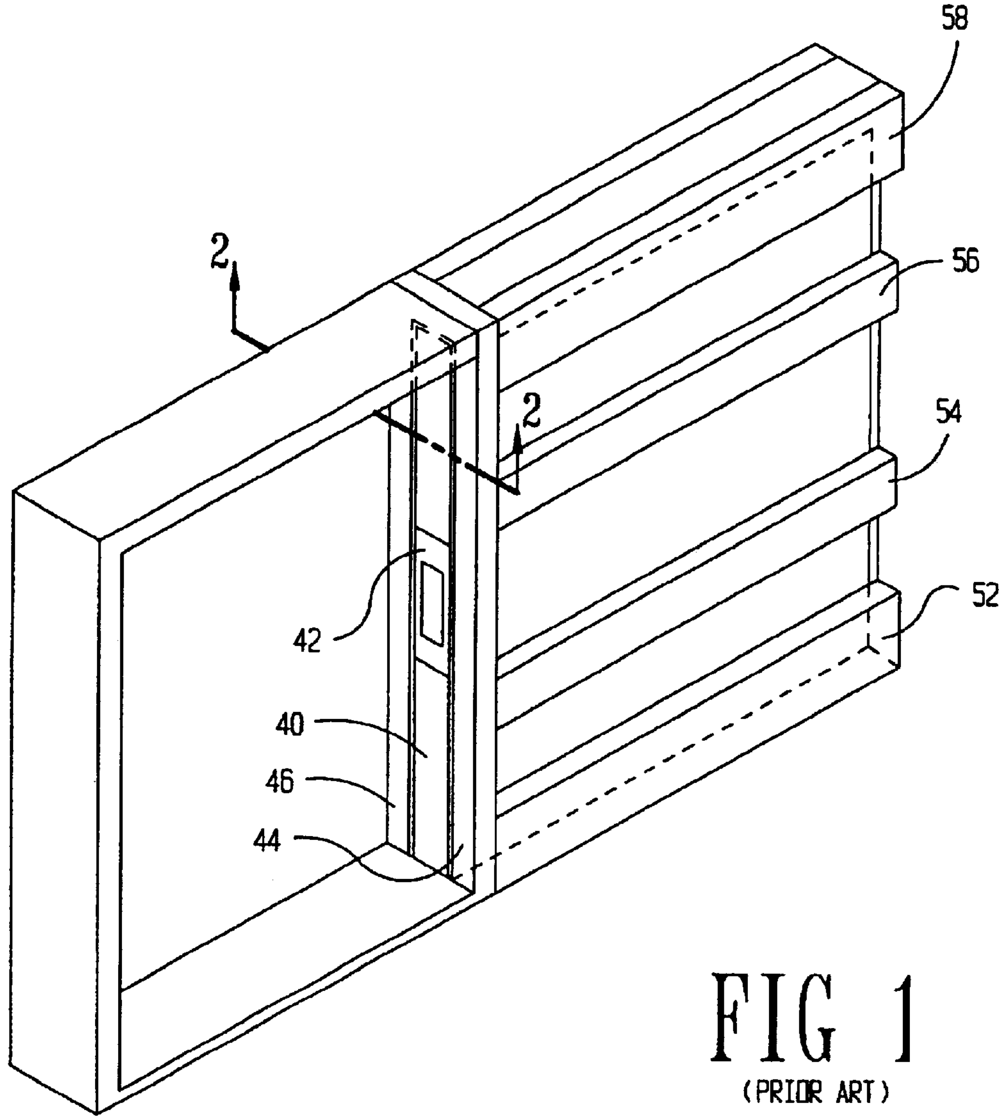
FIG 1 (PRIOR ART)
FIG. 1 shows a related art pocket door assembly.
Figure 2:
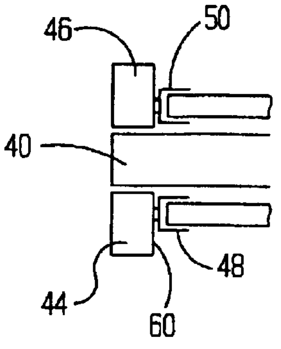
FIG 2 (PRIOR ART)
FIG. 2 shows a cross-section of a portion of the related art pocket door assembly.
Figure 3:
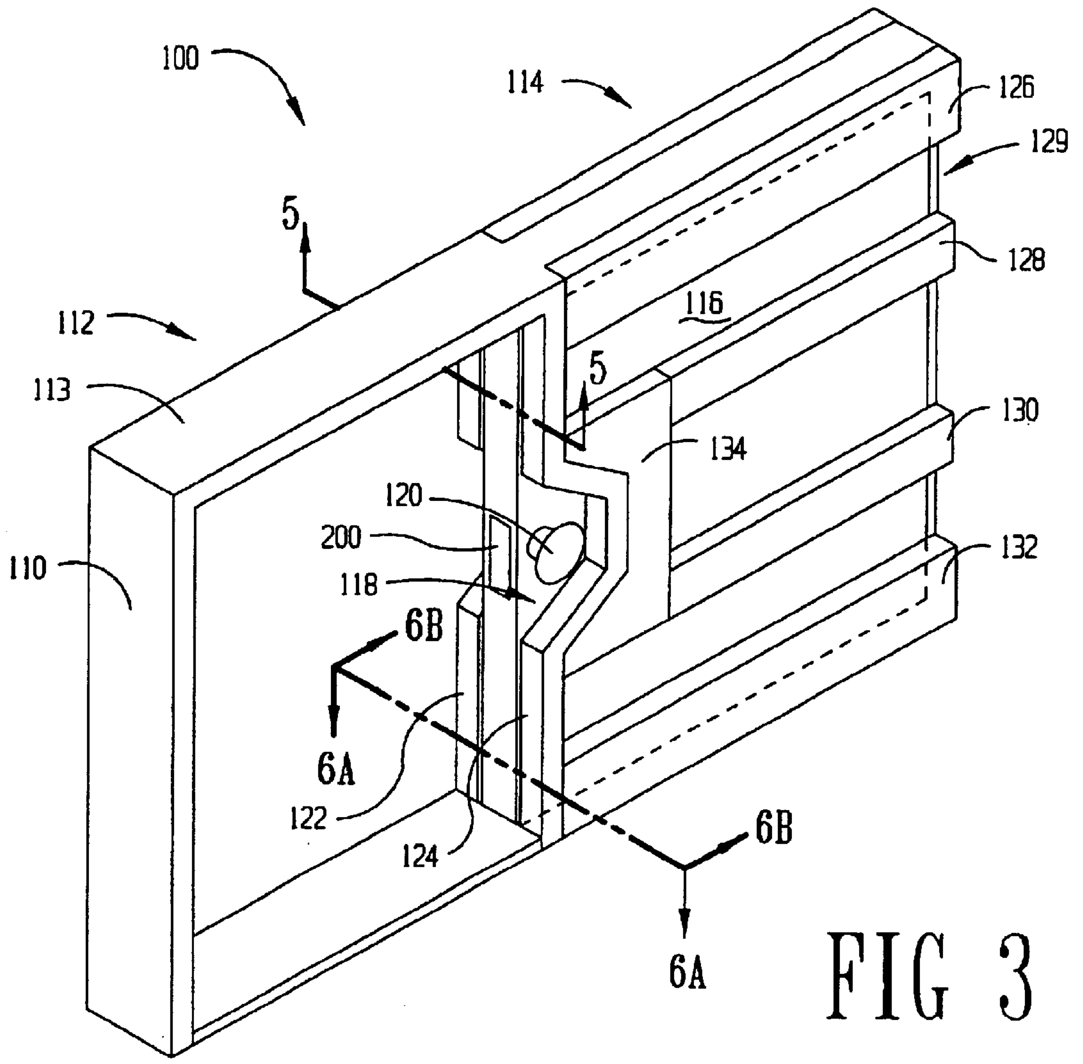
FIG. 3 illustrates a perspective view of a pocket door assembly, with the door retracted or open, in accordance with embodiments of the invention.
Figure 4:
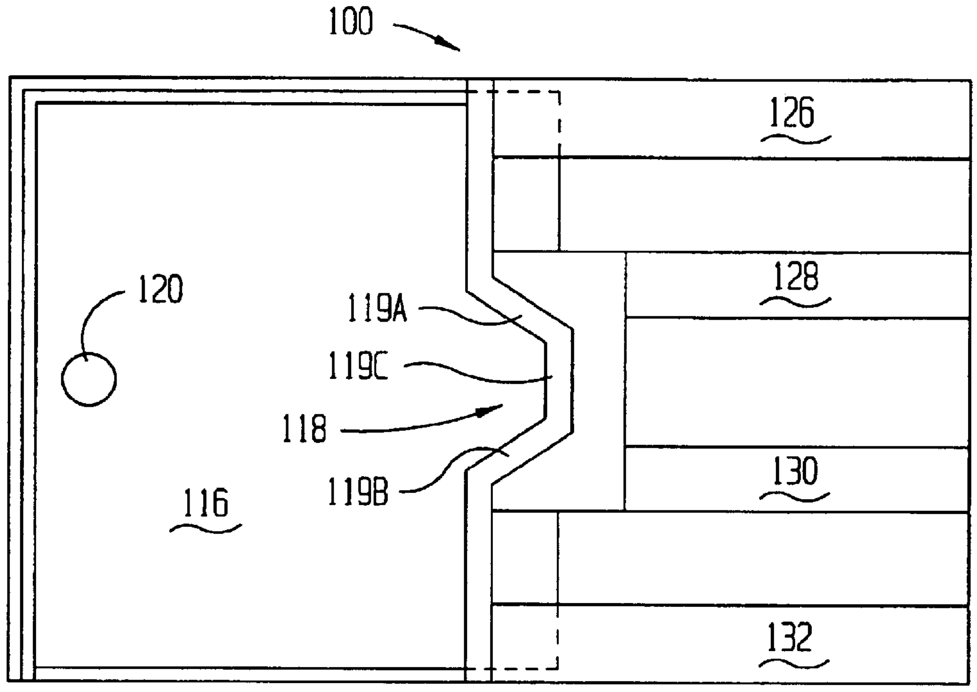
FIG. 4 illustrates an elevational view of a pocket door assembly, with the door extended or closed, in accordance with embodiments of the invention.

FIG. 3 illustrates a pocket door assembly 100 constructed in accordance with embodiments of the invention. In particular, the pocket door assembly 100 may comprise a frame 110 that may generally comprise a doorway portion 112 and a pocket portion 114. The pocket door assembly 100 may further comprise a door 116 slidingly mounted within the frame 110, and in particular, the door 116 may be mounted to a horizontal header assembly 113 which may span substantially an entire upper length of the pocket door assembly. The perspective view of the pocket door assembly 100 of FIG. 3 illustrates the door 116 in its retracted or open position. By contrast, the elevational view of the pocket door assembly 100 of FIG. 4 shows the door 116 in its extended or closed position. Before proceeding, it should be understood that the pocket door assembly 100 illustrated in FIGS. 3 and 4 is as it may be received from a door manufacturer prior to installation, and thus the pocket door assembly is not shown with solid walls covering the pocket portion 114, as would be the case after final installation.

Figure 5:
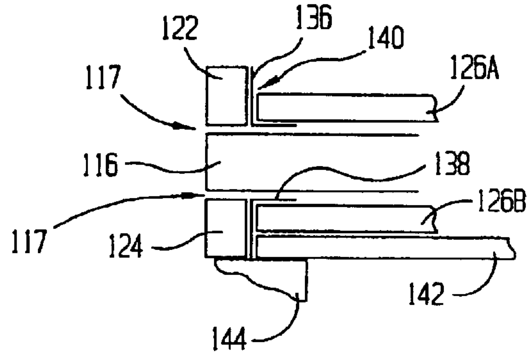
FIG. 5 illustrates a cross-sectional view of a portion of the pocket door assembly taken substantially along lines 5—5 of FIG. 3.

FIG. 5, taken substantially along line 5—5 of FIG. 3, illustrates the coupling of vertical members 122 and 124 to various horizontal members in accordance with at least some embodiments of the invention. The vertical members 122 and 124 may define, in part, an opening through which door 116 may slide or translate. A distance between the door 116 and each vertical member may define a clearance 117. Each vertical member 122, 124 may have coupled thereto a metallic member 136, 138, possibly having an "L" shaped cross-section. The metallic elements 136 and 138 may be aluminum; however, other materials may be equivalently used. In the cross-section illustrated in FIG. 5, the horizontal members 126A and 126B couple to the metallic members 138 and 136 respectively. In at least some embodiments, the horizontal members 126 are made of wood or lumber, and thus the coupling between the horizontal members 126 and the metallic members 122, 124 may be by any suitable connection mechanism, such as screws, bolts, adhesives, and the like. In alternative embodiments, the vertical members 122 and 124 may be created as one assembly, for example using injection molded plastic techniques. In these embodiments, the metallic members 136 and 138 may not be used, and the structural members forming the pocket may not necessarily be horizontal. Although FIG. 5 shows only horizontal members 126A, B coupled to the vertical members, it will be understood that the remaining horizontal members, as well as the brace member 134, may couple in a similar manner.

As is illustrated by FIG. 5, the horizontal members may not precisely align with an outer surface of the vertical members 122 and 124. This forms a shoulder region 140 into which wall board 142 may be placed. For decorative purposes, trim or molding 144 may be attached to the vertical members 122 and 124 (not shown attached to 122). It is noted that the wall board 142 and molding 144 are not shown in FIG. 3, but were included in FIG. 5 for purposes of explaining how these materials may couple to the pocket door assembly 100.

Figure 7:
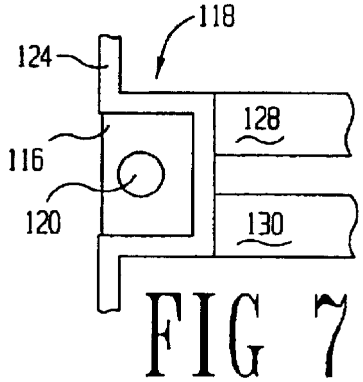
FIG. 7 illustrates an alternative embodiment of the recess.
Figure 8:
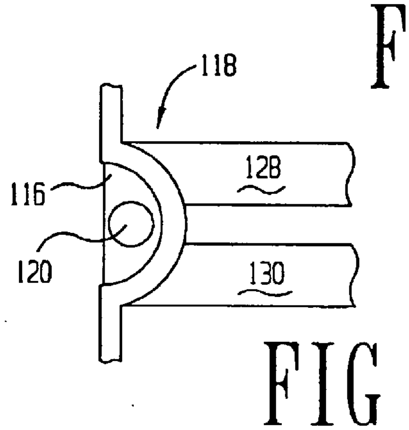
FIG. 8 illustrates yet another alternative embodiment of the recess.

As illustrated in FIGS. 3 and 4, the pocket door assembly 100 of the various embodiments of the invention may have an indention or notch 118. The notch 118 may be defined by an offset in the vertical members 122, 124, as well as corresponding offsets in the metallic members 136, 138, if used, the offset extending toward a back 129 (FIG. 3) of the pocket. As best shown by the door 116 in the retracted or open position as illustrated in FIG. 3, the notch 118 allows for use of a handle 120 extending outwardly from a plane defined by the door a distance greater than the clearance 117 between the door 116 and vertical members 122, 124. The handle 120 may reside, at lest partially, in an area defined by the notch 118 when the door 116 is substantially within the pocket. Although the notch 118 shown in FIGS. 3 and 4 has three sides 119A, B, C (FIG. 4), any shape notch 118 is within the contemplation of this invention. For example, FIG. 7 illustrates an embodiment where the notch 118 is rectangular. Likewise, FIG. 8 illustrates an embodiment where the notch is semi-circular.

The pocket portion 114 of the pocket door assembly 100 may comprise a plurality of horizontal members 126, 128, 130 and 132. Although not specifically shown in FIG. 3, there may be a corresponding set of horizontal members on the opposite side of door 116, and these horizontal members may define, in part, the cavity or pocket of the pocket portion 114. In at least some embodiments, the horizontal members 126, 128, 130 and 132 may be lumber, and may be attachments points for installation of sheet rock or other wallboard material. At least some of the horizontal members, for example horizontal member 128 and 130, may couple to brace member 134, which may simply reinforce the notch 118.

Figure 6A:
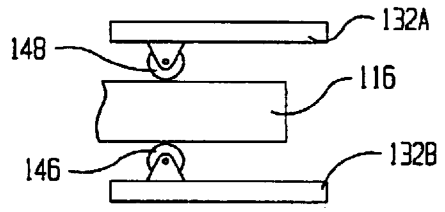
FIG. 6A illustrates a cross-sectional view taken substantially along lines 6A—6A of FIG. 3.
Figure 6B:
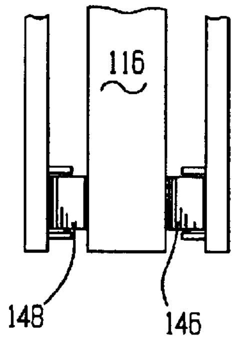
FIG. 6B illustrates a cross-sectional view taken substantially along line 6B—6B of FIG. 3.

FIG. 6A, taken substantially along line 6A—6A of FIG. 3, illustrates that, in at least some embodiments, a lower portion of the pocket assembly 114 may comprise rollers, for example rollers 146 and 148. FIG. 6B, taken substantially along line 6B—6B of FIG. 3, illustrates the rollers 146, 148 from a different perspective. Rollers 146 and 148 may help keep the door 116 centered between the horizontal and vertical members, thus making opening and closing of door 116 easier as well as lessening the likelihood that the door 116 makes unwanted contact with other stationary components, which may damage the door and/or make opening and closing the door difficult.

In installations where door 116 need not be latched closed, for example if the pocket door assembly 100 provides access to a linen closet, it may not be necessary to provide a latch mechanism for the door 116. However, in some installations, for example a pocket door assembly 100 on an entrance to a bedroom or bathroom, the door 116 of the pocket door assembly 100 may comprise a latch mechanism 200 (partially seen in FIG. 3) that may hold the door in the extended or closed position, and which may also be utilized to lock the door.

FIG. 9 shows a cross-sectional view of the latch mechanism 200, which may be utilized with a striker plate 220 as illustrated in FIG. 10, in accordance with embodiments of the invention. The latch mechanism 200 may comprise an elongated outer housing 202 having an axis 204. The latch mechanism may be coupled to the door 116 by inserting the latch mechanism 200 into a hole, possible of circular or semi-circular cross-section (not shown), in the door 116, where an axis of the hole and latch mechanism 204 may be substantially aligned with a direction of translation of the door 116. The latch mechanism 200 may comprise a bolt 206 that slides within a bolt cavity or housing 208. Spring 210 may bias the bolt to an extended position, with pin 212 retaining the bolt 206 within the housing 208. In the rest position, the bias spring 214 may bias the bolt housing 208 against a lower portion of the outer housing 202. As the door 116 is translated out of the pocket portion 114, a latch end 207 of the bolt 206, in particular a curved strike area 216, may contact the cross-bar 218 of the strike plate 220. Initial contact with the strike area 216 may be made near the tip 222 of the bolt 206. The contact may progress from the tip 222 toward the slot 224.

The contact of the bolt 206 with the cross-bar 218, and progress of the contact, may produce two movements of the bolt 206. First, upon initial contact of the bolt 206 with the cross-bar 218, the bolt 206 may compress spring 20 translating or telescoping the bolt 206 into the bolt housing 208. Somewhat simultaneously, contact of the bolt 206 with the cross-bar 218 may pitch the bolt housing 208 (as indicated by arrow 226, and as illustrated in dashed lines). Pitching of the bolt housing 208 may be allowed by a hinge 230, having a stationary portion coupled to the outer housing 202, and a rotating portion coupled to a bolt arm 232. As the contact point moves from the tip 222 toward the slot 224, the latch end 207 of the bolt 206 may extend into an aperture 228 of the strike plate 220 (FIG. 10). As a component of an applied force along an axis of bolt 206 begins to diminish, i.e. the contact point moves closer to the slot 224, the bolt 206 may telescope out of the bolt housing 208 under force applied by spring 210, at which point the slot 224 may slide over a corresponding structure coupled to the doorway portion 112 of the frame, such as cross-bar 218 (FIG. 10). With slot 224 engaging cross-bar 218, the latch mechanism 200 may hold the door in the closed position. To unlatch the latch assembly 200, a rotary handle 120, such as illustrated in FIG. 3, may be rotated. A handle connection member, extending through the door 116 substantially perpendicular to the plane defined by the door 116 and connecting the handle members on each side of the door, in response to rotation of the handle may rotate the bolt assembly housing 208, possibly by application of force on the bolt arm 232. Locking of the door 116 with latch 200 may be accomplished with a doorknob or handle 120 that prevents rotation in the locked position.

FIG. 11 illustrates an interaction between the handle connection member and the bolt arm 232. In particular, FIG. 11 shows a partial cross-sectional elevational view of the latch assembly 200 with the bolt arm 232 pitched by contact of a handle connection member 234. In a rest position, the bolt arm 232 may rest substantially on an upper surface of the handle connection member 234, where that surface is substantially horizontal (the rest position indicated in FIG. 11 by the shadowed connection member in dashed lines). By rotation of the handle (not shown in FIG. 11), the handle connection member likewise may rotate, thereby pitching the bolt housing 208. While some off-the-shelf doorknobs have a substantially square handle connection member, as shown in FIG. 11, other off-the-shelf doorknobs have a handle connection member with a “U” shape (not shown). Operation of the latch assembly in this situation is substantially the same as described above, except upper portions of the “U” shaped handle connection member contact the bolt arm 232. For those doorknobs that implement locking functionality with the “U” shaped handle connection member, a locking rod may reside within a valley of the “U” shaped member, and in this case, the bolt arm 232 may be grooved or arched to allow the bolt arm to rest on the “U” shaped member in spite of the locking rod.

The above discussion is meant to be illustrative of the principles and various embodiments of the present invention. Numerous variations and modifications will become apparent to those skilled in the art once the above disclosure is fully appreciated. For example, the frame 110 of the pocket door assembly may be made of injection molded plastic, with portions thereof reinforced by metallic members. Further, while only three variations for the recess 118 are shown, one of ordinary skill in the art, now understanding the concept of creating a recess and using a protruding handle, such as knob 120, could easily fashion numerous variations for the configuration of the recess 118, and each of these variations falls within the contemplation of this invention. Further, it may be possible to have a door that does not slide completely within the pocket, and in this case a notch may not be required in spite of using a handle that extends a distance greater than the clearance between the door and the vertical member. With regard to the rollers 146 and 148 illustrated in FIGS. 6A and 6B, being circular cylinders having their axis aligned with the vertical members 122 and 124, one of ordinary skill in the art, now understanding the benefits of providing rolling surfaces near a bottom of the door 116, could easily implement many variations, such as ball bearings with suitable housings, and the like. Further, though the embodiments of the invention described show notches formed on both sides of the door 116, the benefits of the invention may be equivalently obtained by a notch 118 on only one side, and correspondingly a handle that extends on only one side of the door. It is intended that the following claims be interpreted to embrace all such variations and modifications.

What is claimed is:

1. A pocket door assembly comprising:

a horizontal header assembly;

a door slidingly mounted to the horizontal header assembly;

a first and second vertical members coupled to the horizontal head assembly, the first and second vertical members defining an opening;

a first plurality of coplanar members coupled to the first vertical member, a plane defined by the first plurality of coplanar members substantially parallel to a plane defined by the door;

a second plurality of coplanar members coupled to the second vertical member and extending a same direction as the first plurality of coplanar members, a plane defined by the second plurality of coplanar members substantially parallel to the plane define by the door;

wherein the first and second vertical members, and the first and second plurality of coplanar members, define a pocket into which the door slides;

a first and second metallic members coupled between the first and second vertical member and the first and second set of coplanar members respectively;

a handle coupled to the door and extending substantially perpendicularly any from the plane defined by the door, the handle extending a distance greater than a clearance between the door and one of the first and second vertical members;

a latch assembly coupled within the door and in operational relationship to the handle; and one of the first and second vertical members defining an indention. the indention having a deflection toward a back of the pocket;

wherein the handle resides at least partially in an area defined by the indention when the door is substantially within the pocket; and wherein the latch assembly latches the door in a closed position, and wherein the handle releases the latch assembly from a latched position when the handle is rotated.

2. The pocket door assembly as defined in claim 1 wherein each of the first and second metallic members further comprises a metallic member having an “L” shaped cross-section.

3. The pocket door assembly as defined in claim 2 wherein the metallic member further comprises an aluminum material member having the “L” shaped cross-section.

* * * * *